Inventor
Harry O. Newlin
by W. Bartlett Jones,
Attorney

Dec. 7, 1965   H. O. NEWLIN   3,221,855
SINGLE REVOLUTION CLUTCH MECHANISM
Original Filed Aug. 7, 1961   5 Sheets-Sheet 3

Inventor
Harry O. Newlin
by N Bartlett Jones
Attorney

Dec. 7, 1965     H. O. NEWLIN     3,221,855
SINGLE REVOLUTION CLUTCH MECHANISM
Original Filed Aug. 7, 1961     5 Sheets-Sheet 4

Inventor
Harry O. Newlin
by W. Bartlett Jones
Attorney

Dec. 7, 1965  H. O. NEWLIN  3,221,855
SINGLE REVOLUTION CLUTCH MECHANISM
Original Filed Aug. 7, 1961  5 Sheets-Sheet 5

Inventor
Harry O. Newlin
by W. Bartlett Jones
Attorney

United States Patent Office 3,221,855
Patented Dec. 7, 1965

3,221,855
SINGLE REVOLUTION CLUTCH MECHANISM
Harry O. Newlin, Skokie, Ill., assignor to The Frederick Post Co., Chicago, Ill., a corporation of Illinois
Original application Aug. 7, 1961, Ser. No. 129,856. Divided and this application Mar. 11, 1964, Ser. No. 351,030
7 Claims. (Cl. 192—84)

The present invention relates to clutch mechanisms useful when activated to effect a single revolution of a rotary member. In particular, it relates to a slip-clutch.

The present application is a division of my copending application Serial No. 129,856 filed Aug. 7, 1961, now abandoned. In said application there is described a photo-printing apparatus in which actinic light prints onto a light-sensitive sheet through a superimposed original in the form of a light-transmitting sheet having an image or pattern thereon to be reproduced. In particular, it refers to producing diazotypes in a machine to which are fed the laminated original and sensitive sheets. The two sheets pass over a light-containing exposure cylinder and as carried away therefrom approach a suction cylinder which picks up the printed sheet and carries it away from the original.

In said apparatus the suction cylinder rotates continuously, but exerts an effective suction area for only one revolution for each set of laminations fed to it.

It is the object of the present invention to provide means for effecting said single revolution of the suction area.

It is a particular object of the invention to use the continuously operating suction cylinder as the driving means for mechanism effecting said one revolution.

It is also a particular object of the invention to provide a slip-clutch mechanism capable of effecting but one revolution of a driven member.

It is also a particular object of the invention to provide a clutch mechanism to be actuated for producing said one revolution, in which the actuation may continue longer than the period of the one revolution.

Various other and ancillary objects and advantages of the invention will appear from the following explanation of the invention by reference to a light-printing machine such as may be used for blue-prints and diazotypes.

Briefly described, a transparency and a light-sensitive sheet in contact for printing are fed to conveyer means which carries them to and around a revolving transparent exposure cylinder within which is located the light source. During this passage a latent image is formed, later to be developed. The two are held in contact with each other between belts of the conveyer means and the exposure cylinder. In feeding the sheets into the machine, they should have their leading edges close together within limits, with either one leading, for reasons which will appear hereinafter. At or near a fixed point where the main conveyer belts tangentially leave the exposure cylinder, a battery of pick-up fingers lifts the lamination of said two sheets from the exposure cylinder and they and the belts move toward a pick-up cylinder. There is a wide gap between two belts so that the light-printed sheet may contact the pick-up cylinder at the gap area.

The pick-up cylinder has a band of openings for suction extending around its periphery so that a suitable open area is presentable to a sheet as soon as it arrives. Means is provided to create continuous sub-atmospheric pressure within the suction cylinder, which cylinder rotates continuously while the machine is in use, by reason of the several endless belts which drive it and the exposure cylinder.

However, in order to minimize wasteful use of suction through the suction openings, means is provided to block said openings except for a small arcuate extent located when stationary at a proper position to pick up the printed sheet. In connection therewith, is means to move the arcuate region of suction with the picked up sheet from its stationary position through one revolution back to a condition of rest at said stationary position. This is preferably effected by electrical control means actuated by the approach of the two sheets to the pick-up cylinder.

In moving to the pick-up cylinder the conveyer belts contact the cylinder. By reason of the gap between belts the printed sheet may contact the cylinder. Within the regions of the belts there is no force holding the printed sheet to the belts so the assembly of the two sheets could fall away from the belts, when they are positioned below the belts and below the pick-up cylinder. But, in the gap area of the cylinder, the described openings which exert suction, draw the printed sheet to the cylinder and carry it upwardly so that the other sheet may either fall away from it or continue in a different direction.

Between the exposure cylinder and the pick-up cylinder are located pick-up fingers which ride on the exposure cylinder and pick the lamination of two sheets from it. The fingers are preferably formed as guides to hold the lamination in contact with the belts and to direct the removed sheets tangentially to the pick-up cylinder for contact with the suction area thereof.

The presently preferred form of the apparatus briefly described above is shown in the accompanying drawings, in which.

Figure 1:
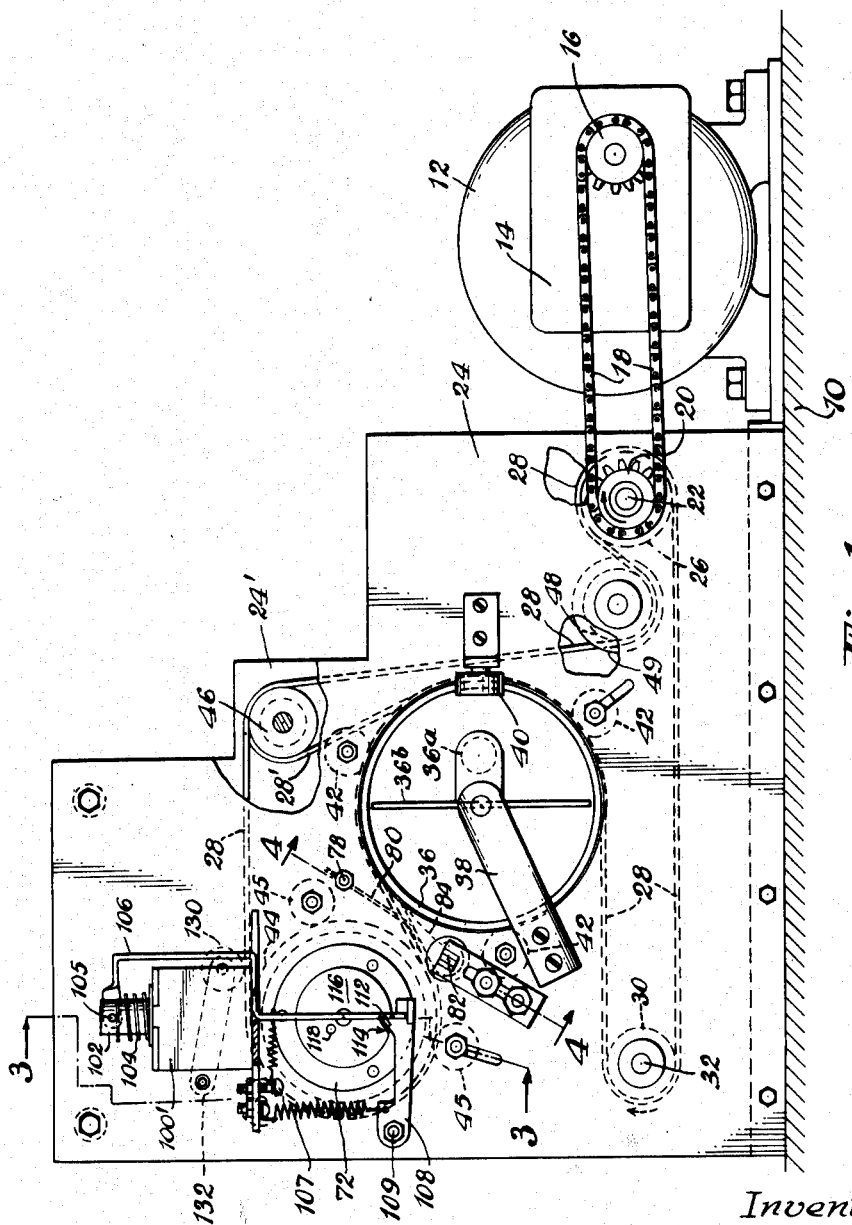
FIG. 1 is a side view of the apparatus with parts of the side plate broken away.

In FIG. 1, a base 10 carries a motor 12 with which is associated a speed reduction box 14 for a slow-speed driving gear 16. A driving chain 18 connects gear 16 to gear 20 on a shaft 22 bearing in side plates 24 and 24'.

Shaft 22 within the side plate 24 provides a driving roll 26 around which are looped a plurality of spaced conveyer tapes or belts generally designated 28. The bottom runs of the tapes in FIG. 1 move to the left and around idling cylinder 30 on shaft 32 (see FIG. 2).

The upper horizontal runs of the tapes 28 in FIG. 1 move to the right to and around a transparent rotary exposure cylinder 36, containing a light source 36a and a reflector 36b, both held stationary by bracket means indicated at 38 secured to the side plates 24 and 24'. One of two guiding rollers at the end edges of the exposure cylinder is shown at 40, and peripheral positioning rollers are shown at 42.

To the left of and above the axis of the exposure cylinder 36 is a pick-up cylinder 44, positioned so that the tangent from the upper part of exposure roll 36 to the lower part of the cylinder 44 slopes downwardly.

Figure 2:
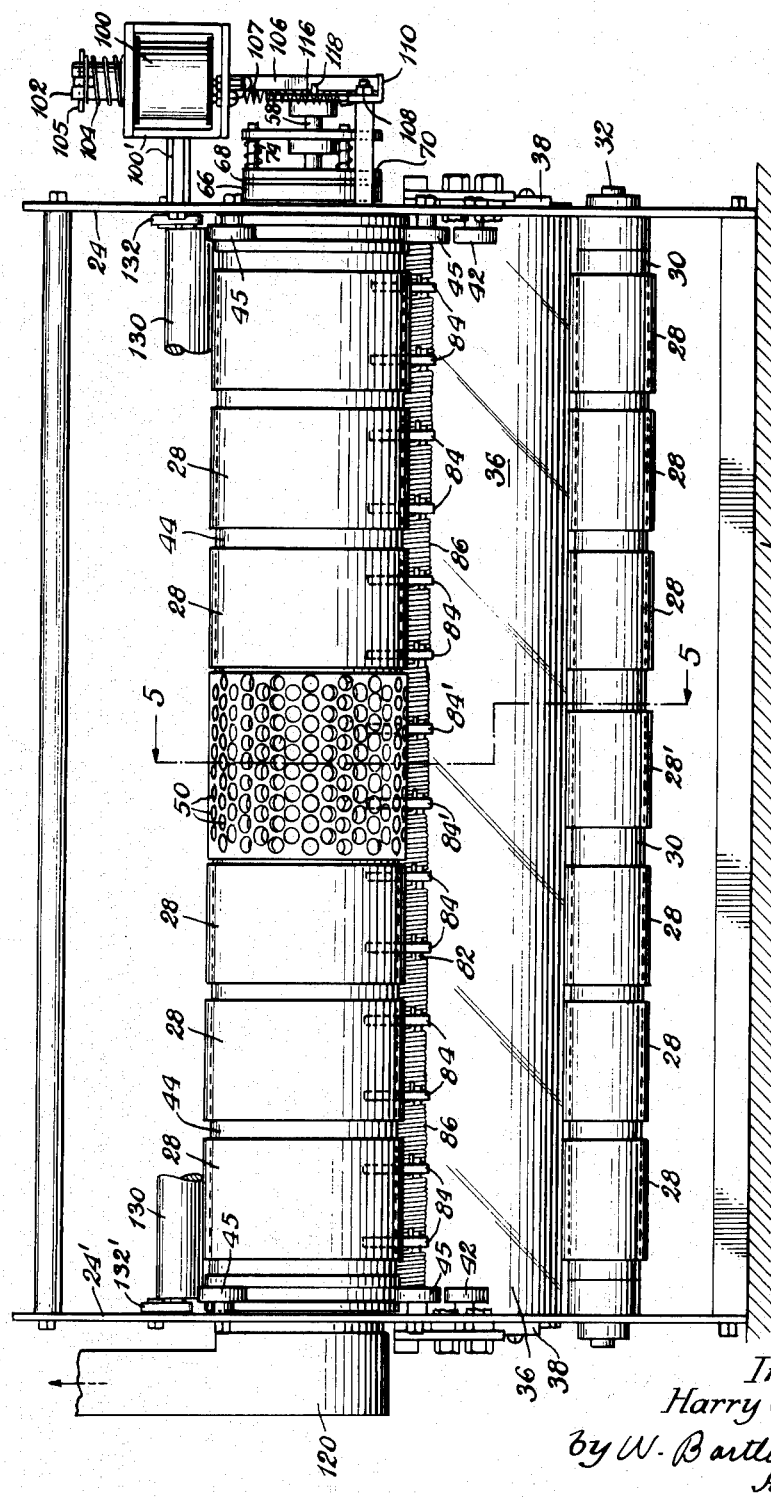
FIG. 2 is a front view of the apparatus shown in FIG. 1.
Figure 3:
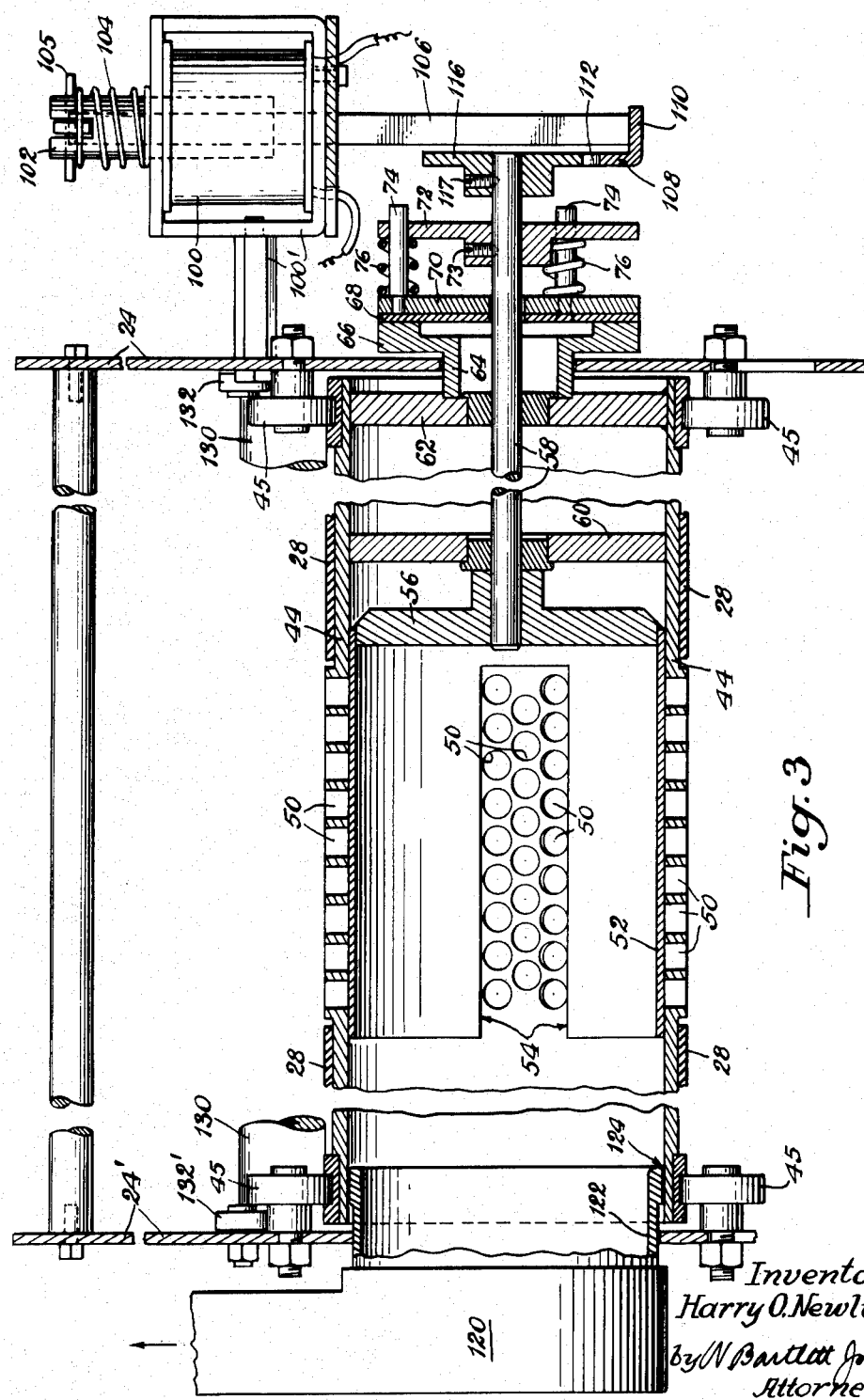
FIG. 3 is an enlarged view in cross-section on line 3—3 of FIG. 1, showing at the right a cross-section of the solenoid and the parts operated in connection therewith.
Figure 5:
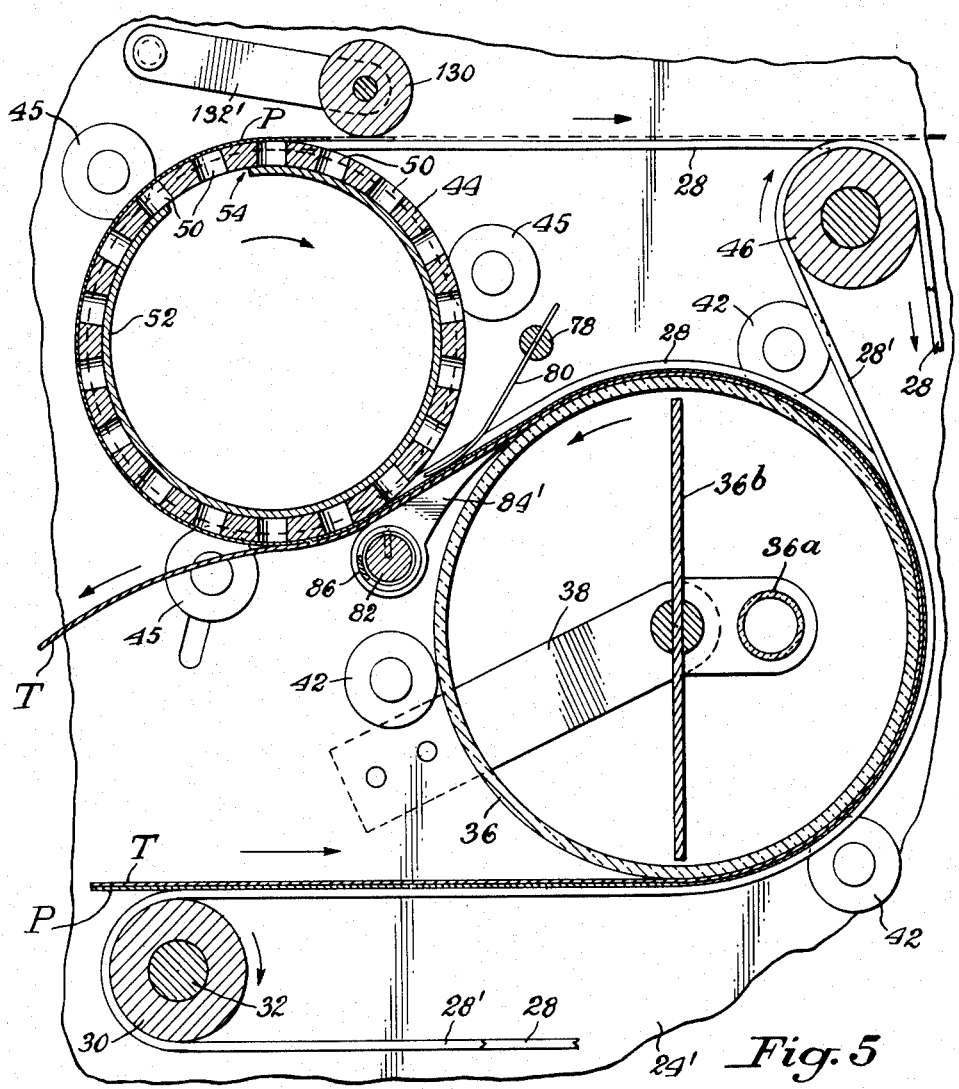
FIG. 5 is an enlarged cross-section taken on the line 5—5 of FIG. 2.

FIGS. 2 and 3 shows peripherally located idler rolls 45 which position cylinder 44 and permit its rotation. Cylinder 44, as illustrated in FIG. 2, shows an exemplary number of six tapes 28 passing over it, and an exemplary gap between two of the tapes 28, which gap is formed between two tapes by reason of one or more tapes 28' leaving the exposure cylinder, as shown in FIG. 5 at the right, to join the other tapes 28 over idler roll 46, which leads all the tapes 28 (FIG. 1) to idler roll 48 over which they pass to driving roll 26. Spacer flanges 49 are present on roll 48 to aline the belts 28.

The cylinder 44 at the gap is slightly larger in diameter than under the belts and is substantially the same as the adjacent portions with their belts, thus to give a uniform diameter for receipt of a sheet. This larger gap section is provided with perforate area substantially continuous around the periphery, preferably by a number of closely packed circular openings 50 sufficiently small to prevent inadvertent receipt of a finger. Cylinder 44 is driven by a friction from the tapes 28 passing over it, excepting tapes 28'.

The circumferential area containing the holes 50 is available for exerting suction to pick up a sheet brought to the cylinder. To limit the extent of said area which exerts suction, additional means is provided.

Bearing within the cylinder 44 is an inner hollow cylinder 52 with closed area to block a major arcuate portion of the holes 50 and an open area in the form of an elemental slot 54 of small arcuate width in its circumference to register at all times with open area of said holes 50. FIG. 3 shows the inner cylinder 52 closed at its right end by a disk 56 rigid with shaft 58 extending to the right well beyond the side plate 24. Shaft 58 bears in a partition plate 60 within cylinder 44 and an end plate 62 for the cylinder 44.

End plate 62 is rigid with a collar 64 extending through side plate 24, which collar carries a friction clutch operable to effect turning of the inner cylinder 52 with the outer cylinder 44.

The friction clutch comprises clutch plate 66 integral with collar 64 against which is a friction disk 68. Facing the friction disk 68 is a second clutch plate 70 under spring-pressure and connected to rotate shaft 58 through the clutch, being thus driven by the outer cylinder 44. A driven plate 72 is secured to the shaft 58 by set screw 73 and is spaced away from clutch plate 70 to which it is connected by pins 74 rigid in clutch plate 70 and slidable in driving plate 72. Around the pins are springs 76 urging clutch plate 70 onto the friction disk 68.

Figure 4:
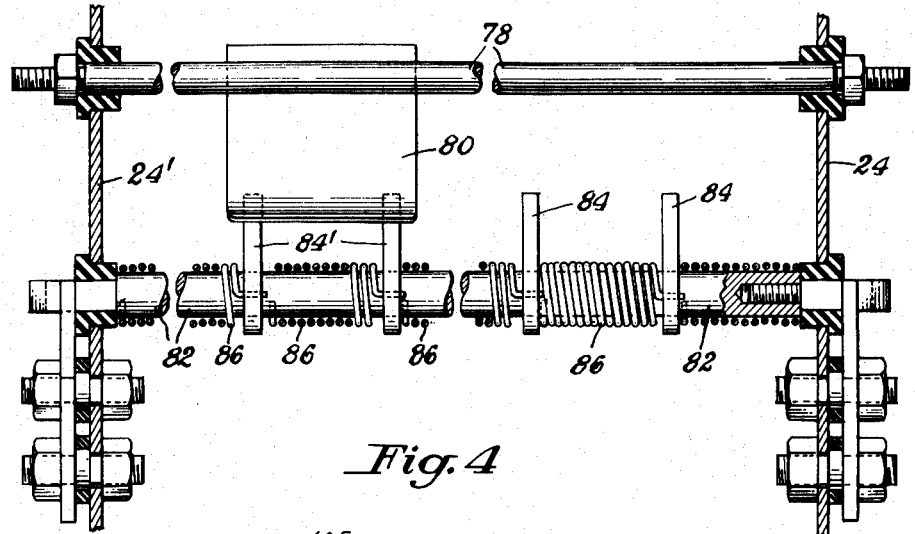
FIG. 4 is an enlarged view taken on line 4—4 of FIG. 1, showing the insulated structure related to the electrical control.

The above-described clutch is related to an electrical system for actuating the inner cylinder 52. FIG. 4 shows a bar 78 carried by and insulated from the side plates 24 and 24'. This bar carries a contact plate 80.

Another bar 82 is likewise fixed and insulated in the side plates, and it carries pick-up fingers 84 rotatable on the bar, each normally urged in one direction by its individual spring 86 around the bar. These fingers are shown in FIG. 5 as normally urged onto the exposure cylinder 36, to lift the laminated sheets from the cylinder and to guide them into contact with separation cylinder 44. The fingers designated 84' in FIG. 4 are special contact metal and lie in the zone of the holes 50 in the suction cylinder 44. Normally, they contact the plate 80 and complete an electric circuit, that is, when no sheet from the exposure cylinder 36 intervenes.

Figures 7, 8:
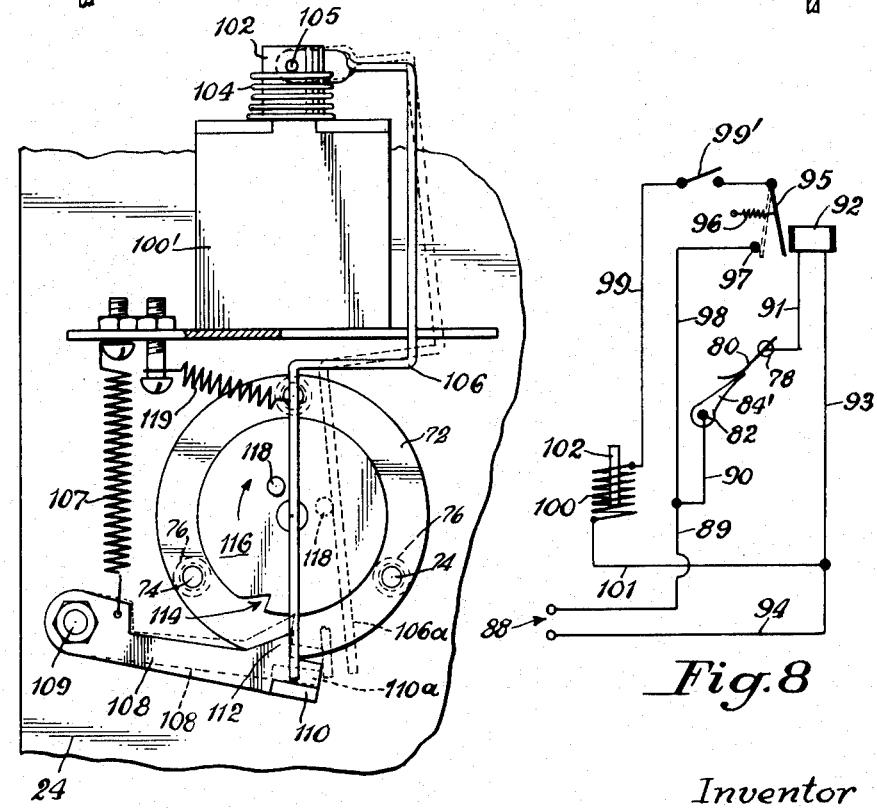
FIG. 7 is a side view of the solenoid showing two positions of the controlling bar during energization of the solenoid.
FIG. 8 is a diagram of the electrical connections including diagrammatically associated parts connected therewith.

FIG. 8 shows the electrical circuit. The power source 88 is connected by wires 89–90 to bar 82 and fingers 84', and by contact with the contact plate 80 to bar 78. Bar 78 connects by wire 91 through relay 92 and back by wires 93–94 to source 88.

When the relay is energized its armature 95 is pulled against spring 96, so that on de-energization the armature 95 strikes contact 97 which is connected by wire 98 to live wire 89. Armature 95 is connected by wire 99 and control switch 99' through solenoid 100 and by wire 101, to the live wire 94. Within the solenoid is a spring pressed plunger 102 (FIGS. 3 and 7) drawn inwardly against spring 104 on energizing the solenoid. Thus, when a print approaches the suction cylinder 44, it energizes the solenoid 100, provided switch 99' is closed. When pick-up by suction is undesired, switch 99' is opened.

The solenoid 100 is mounted in an open casing 100' carried by the side plate 24 and is associated with means to cause the suction cylinder 44 to pick up the top sheet from the exposure cylinder. Such means may take various forms and the following described means is illustrative.

In FIG. 7, there is a horizontal pivot pin 105 through the top of plunger 102, on which pivots a downwardly extending arm 106, bent to pass around the solenoid. This operates as a pusher to move against a spring 107 a detent 108 pivoted at 109, to side plate 24. The detent has a horizontally projecting tab 110 which in FIG. 3 contacts the end of arm 106 in position to be pushed down by the arm 106, and which in FIG. 7 is shown pushed down during energization of the solenoid.

FIG. 1 also shows the same position as FIG. 3 for the detent 108 and pusher arm 106, and also shows an upright tooth 112 on detent 108 in a notch 114 of the periphery of a disk 116 fixed on the end of shaft 58 by set screw 117. By means of set screw 117, the relative arcuate positions of disk 116 and slot 54 may be changed for reasons explained below. FIG. 7 shows the tooth 112 releasing the disk 116 for rotation. When the disk 116 is free to turn, it is driven through the friction clutch by shaft 58. When the tooth 112 is in its detaining position (FIG. 1) in the notch 114, the clutch slips and the inner cylinder 52 is stationary.

Means is provided to limit the released rotation of the inner cylinder to one revolution. A horizontal pin 118 projects from disk 116 in position to move pusher bar to the right in FIGS. 1 and 7, as the disk 116 moves clockwise, and to move it from its position holding down the tab 110. When the pusher arm 106 is thus moved to position 106a in FIG. 7, the spring 107 draws the detent up until the tooth 112 rides on the rim of disk 116 as shown by dotted lines in FIG. 7. In this position, the tab 110 is in position 110a in FIG. 7, and sufficiently high to obstruct the return of arm 106 to its normal position over the tab 110. Thus, the detent is free to rise so that the tooth 112 will enter notch 114 at the end of one revolution of the disk. This condition prevails until the solenoid is de-energized as a result of contact between fingers 84' and plate 80. Then, the spring 104 around plunger 102 raises arm 106 which is drawn back over the tab 110 by its lateral biasing spring 119 for a new cycle of operation.

During the one revolution of the disk 116, suction from the interior of inner cylinder 52 functions through its slot 54 registering with a narrow band of holes 50 in the outer cylinder 44, as the two rotate together. The disk 56 at the one end of the inner cylinder forms one closure for a chamber for sub-atmospheric pressure, created by a suction fan unit 120 (FIG. 3) opening into the free open end of outer cylinder 44 through a stationary short tubular conduit 122 having a bearing seal at 124 with the interior of cylinder 44.

FIG. 5 best shows the operation of the apparatus. Onto the upper horizonal run of the belts 28 is fed the assembly of light-sensitive paper P and transparency T, the latter uppermost. Within the area of the suction gap the leading edge of sheet T may or may not be ahead of the leading edge of sheet P. The belts 28 carry the lamination around the cylinder 36 at a speed effective to complete the light-printing. The belts 28 holds the lamination tightly against the exposure cylinder 36 and drive the latter. On reaching the pick-off fingers 84, the conveyor belts 28, excepting belt or belts 28', continue their endless path and immediately pass around and drive the suction cylinder 44. The fingers 84 keep the sheets close to the belts, except in the area of the suction holes 50, at which the belt or belts 28' have left the exposure cylinder as shown in FIG. 5.

Figure 6:
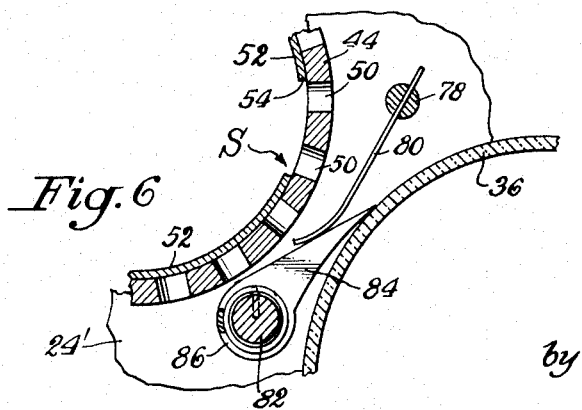
FIG. 6 is a fragmentary view of a portion of FIG. 5 with the parts in normal starting position.

At the moment that the contact is broken by the leading edge of one or the other of the transparency and the printed paper, or by the coincident edges of both sheets, the slot 54 of the inner cylinder is stationary preferably at a location S (FIG. 6) upwardly away from the vicinity of the bar 82 carrying the fingers as shown in FIG. 6. This is its normal stationary position effected by the detent and notch above-described. Its normal position is adjustable by resetting the disk 116 on shaft 58 by setscrew 117. The normal position S could be located so that as soon as a leading edge of a sheet reaches position S, the suction picks up the sheet and the suction area revolves with the perforate cylinder. But, with such a position S, the top sheet must have a leading edge so related to the leading edge of the under-sheet that only the top-sheet, or the print P, is picked and the other sheet, or transparency T, falls away. In order to give latitude to the operator in assembling the two sheets, either one may lead. The extent to which the sheet T may lead is controlled by the location of the position S. Preferably, the position S is near that shown in FIG. 6, thus permitting the sheet T to lead by about ¾-inch.

The point at which contact is broken at the fingers 84' and the plate 40 also may be moved, as this is related to the location of position S.

On breaking the contact, switch 99' being closed, the inner cylinder 52 starts to rotate and adjustments are so made that when the suction area meets the moving sheets, it acts first on sheet P. The suction holds the leading portion of sheet P to the cylinder 44, allowing sheet T to drop away as shown in FIG. 5.

At each side of the holes 50 in the suction cylinder, the sheet P rests on the uppermost runs of the conveyer belts 28, which can be used to carry the sheet to the right for delivery to developing means (not shown). The belts 28 peel the sheet P from the suction area. To maintain the sheet P in resting contact on the belts 28, an idler roll 130 rides on the paper P over the upper stretches of the belts. It is mounted in links 132 and 132', respectively pivoted in side plates 24 and 24'.

It is to be understood that the apparatus may be constructed with multiple gap areas for suction holes 50, and for large sized prints two or more such regions may be provided. The invention is not to be considered as limited to the preferred embodiment and the preferred usage given above, and other forms and uses are contemplated as falling within the scope of the appended claims.

I claim:

1. In combination a slip-clutch having a rotary driving member and a rotary driven member with constant slip-friction engagement therebetween, means continuously to rotate the driving member, a detent movable into and out of position to hold the driven member against rotation, means to bias said detent into holding position, activatable control means comprising a detent-release member movable from an initial position upon initiation of actuation into a position to move said detent out of holding position, whereby to free said driven member for rotation, detainable means carried by said driven member for movement thereby in a circular path from a position of released detention back to said position for retention by said detent, second means carried by said driven member to move said release member out of detent-releasing position prior to completion of one revolution of said driven member, whereby said detent is moved by its biasing means into a position holding said release member out of detent-releasing position, whereby said driven member rotates once and moves said detainable means into said position to be held by said detent, thereby to arrest the driven member after one revolution, said control means upon deactivation effecting movement of said release member into said initial position.

2. A slip-clutch according to claim 1 in which said detainable means is formed by a recess in said driven member, and in which said detent has a detaining portion to enter said recess under the force of said detent biasing means.

3. A slip-clutch according to claim 1 in which said detainable means is formed by a recess in a concentric periphery of said driven member, and in which said detent has a detaining portion to enter said recess and when out of said recess to ride on said periphery.

4. A slip-clutch according to claim 1 in which said driven member has a disc exposing a face thereof, in which said detent-release member is located over said face and moves along the face in its said movement out of detent-releasing position, and in which said second means is a pin projecting from said face.

5. A slip-clutch according to claim 1 in which said release member is actuated for movement in one direction into releasing position by an energized solenoid, and in which said release member during said energization is movable in another direction out of detent-releasing position by said second means.

6. Control means for effecting a single revolution of a rotary driven member, comprising a rotary driving member, a rotary driven member, a slip-clutch normally connecting said members for rotation together, said clutch being arranged to slip when said driven member is held against rotation, moveable detent means to hold said driven member against rotation, first spring means holding said detent means in detaining position, said driven member carrying detainable means for movement in a rotary path by said driven member to be detained against rotation by said detent means in the latter's detaining position, activatable means positioned when activated against a substantially longitudinal bias to move in one direction and to hold said detent means out of said detaining position whereby said driven member starts rotation, second spring means normally holding said activatable means against activated movement in said direction, said activatable means being movable laterally of said direction in its activated position against a substantially lateral bias out of its position of holding said detent means out of its detaining position, third spring means normally holding said activatable means against said lateral movement, means carried by said driven member in a circular path such that during an incomplete revolution of the driven member it moves said activated means against said third spring means away from said detent means, said detent means then being moved by said first spring means into a position holding said activated means against its said lateral bias whereby said driven member may complete one revolution and effect detention by said detent means in its detaining position, said activatable means upon deactivation being moved by said second spring means and by said third spring means into position for again moving said detent means out of said detaining position upon further activation.

7. In combination a frame member, a slip-clutch having its axis fixed in said frame and having a rotary driving member and a rotary driven member with constant slip-friction engagement therebetween, means continuously to rotate the driving member, a detent movable into and out of position to hold the driven member against rotation, means to bias said detent into holding position, activatable control means comprising a detent-release member movable from an initial position upon initiation of actuation into a position to move said detent out of holding position, whereby to free said driven member for rotation, said driven member comprising a shaft and means adjustably secured to said shaft for varying the arcuate relation between said shaft and said means, detainable means carried by said adjustable means for movement thereby in a circular path from a position of released detention back to said position for retention by said detent, second means carried by said adjustable means to move said release member out of detent-releasing position prior to completion of one revolution of said driven member, whereby said detent is moved by its biasing means into a position holding said release member out of detent-releasing position, whereby said driven member rotates once and moves said detainable means into said position to be held by said detent, thereby to arrest the driven member after one revolution, said control means upon deactivation effecting movement of said release member into said initial position, an electric switch to activate said control means, said switch having a fixed position in said frame, two concentric hollow cylinders, a first one of said cylinders being a part of the driving member, and the second one of said cylinders being carried and rotated by said driven shaft, whereby adjustment of the arcuate relation of said adjustable means to said shaft adjusts the arcuate relation of said arrested position of said second cylinder and said switch.

References Cited by the Examiner

UNITED STATES PATENTS

| | | | |
|---|---|---|---|
| 992,252 | 5/1911 | Richards | 188—85 |
| 1,027,262 | 5/1912 | Levey | 192—25 |
| 1,555,724 | 9/1925 | Tuppen | 192—22 X |
| 2,778,472 | 1/1957 | Young | 64—30 |

DAVID J. WILLIAMOWSKY, *Primary Examiner.*

UNITED STATES PATENT OFFICE
CERTIFICATE OF CORRECTION

Patent No. 3,221,855                                         December 7, 1965

Harry O. Newlin

It is hereby certified that error appears in the above numbered patent requiring correction and that the said Letters Patent should read as corrected below.

Column 1, lines 14 and 15, for "now abandoned." read -- now Patent No. 3,138,374, issued June 23, 1964. --; column 3, line 24, for "a friction" read -- friction --.

Signed and sealed this 4th day of October 1966.

(SEAL)
Attest:

ERNEST W. SWIDER                                  EDWARD J. BRENNER
Attesting Officer                                      Commissioner of Patents